United States Patent
Matthews et al.

(10) Patent No.: US 8,296,670 B2
(45) Date of Patent: Oct. 23, 2012

(54) ACCESSING A MENU UTILIZING A DRAG-OPERATION

(75) Inventors: David A Matthews, Seattle, WA (US); Chaitanya D Sareen, Seattle, WA (US); Patrice L Miner, Kirkland, WA (US); Bret P Anderson, Puyallup, WA (US); Jason Silvis, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 837 days.

(21) Appl. No.: 12/123,196

(22) Filed: May 19, 2008

(65) Prior Publication Data
US 2009/0288044 A1    Nov. 19, 2009

(51) Int. Cl.
*G06F 3/048*    (2006.01)
(52) U.S. Cl. ......... 715/769; 715/762; 715/764; 715/770
(58) Field of Classification Search .................. 715/863, 715/769, 762, 764, 770
See application file for complete search history.

(56) References Cited

U.S. PATENT DOCUMENTS

| | | | | |
|---|---|---|---|---|
| 5,148,155 | A * | 9/1992 | Martin et al. ................. | 345/173 |
| 5,612,719 | A * | 3/1997 | Beernink et al. .............. | 345/173 |
| 5,745,116 | A * | 4/1998 | Pisutha-Arnond ............ | 715/863 |
| 5,745,717 | A | 4/1998 | Vayda | |
| 5,784,504 | A * | 7/1998 | Anderson et al. ............. | 382/309 |
| 5,805,167 | A * | 9/1998 | van Cruyningen ........... | 715/808 |
| 5,806,167 | A * | 9/1998 | Yang .............................. | 29/525 |
| 5,864,635 | A * | 1/1999 | Zetts et al. .................... | 382/187 |
| 6,057,844 | A * | 5/2000 | Strauss ......................... | 715/863 |
| 6,195,094 | B1 | 2/2001 | Celebiler | |
| 7,107,540 | B1 | 9/2006 | Carroll | |

(Continued)

FOREIGN PATENT DOCUMENTS
JP    2001282405 A    10/2001

OTHER PUBLICATIONS

Microsoft Corporation, "Command Buttons", 2008, http://msdn2.microsoft.com/en-us/library/aa511453.aspx, Feb. 28, 2008.
Codejock Technologies, LLC, "Command Bar Split Button Popup Control", 2008, http://www.codejock.com/products/commandbars/tour_17.asp, Feb. 28, 2008.
Foss Software, Inc., "Professional UI Solutions", 2008, http://www.prof-uis.com/elegant-ribbon-tour.aspx?view=dotnet_control_split_button, Feb. 28, 2008.

(Continued)

*Primary Examiner* — Tadeese Hailu
(74) *Attorney, Agent, or Firm* — Shook Hardy & Bacon L.L.P.

(57) ABSTRACT

Computer-readable media, computerized methods, and computer systems for intuitively invoking a presentation action (e.g., rendering a menu) by applying a drag-operation at a top-level control button rendered at a touchscreen display are provided. Initially, aspects of a user-initiated input applied at the top-level control button are detected. These aspects may include an actuation location and a distance of a drag-movement therefrom. If a distance of the drag-movement at the touchscreen display is greater than a threshold distance in a particular radial direction from the actuation location, the user-initiated input is considered a drag-operation. Typically, a set of trigger boundaries are constructed based on system metrics to assist in disambiguating the drag-operation from a tap-type operation. If a drag-operation is identified, the presentation action is invoked; otherwise, a principle action associated with the top-level control button (e.g., manipulating content of an application) may be invoked.

20 Claims, 8 Drawing Sheets

U.S. PATENT DOCUMENTS

| | | | |
|---|---|---|---|
| 7,164,410 B2 * | 1/2007 | Kupka | 345/156 |
| 2003/0025676 A1 | 2/2003 | Cappendijk | |
| 2005/0246331 A1 | 11/2005 | De Vorchik | |
| 2006/0135238 A1 | 6/2006 | Lancaster | |
| 2006/0242591 A1 | 10/2006 | Van Dok | |
| 2007/0075915 A1 | 4/2007 | Cheon et al. | |
| 2007/0103468 A1 * | 5/2007 | Saini et al. | 345/440 |
| 2007/0157115 A1 * | 7/2007 | Peters | 715/808 |
| 2007/0157125 A1 * | 7/2007 | Peters | 715/837 |
| 2007/0282788 A1 | 12/2007 | Lamb | |

OTHER PUBLICATIONS

International Searching Authority; International Application No. PCT/US2009/032915; Patent Cooperation Treaty; Sep. 1, 2009; 10 pages.

* cited by examiner

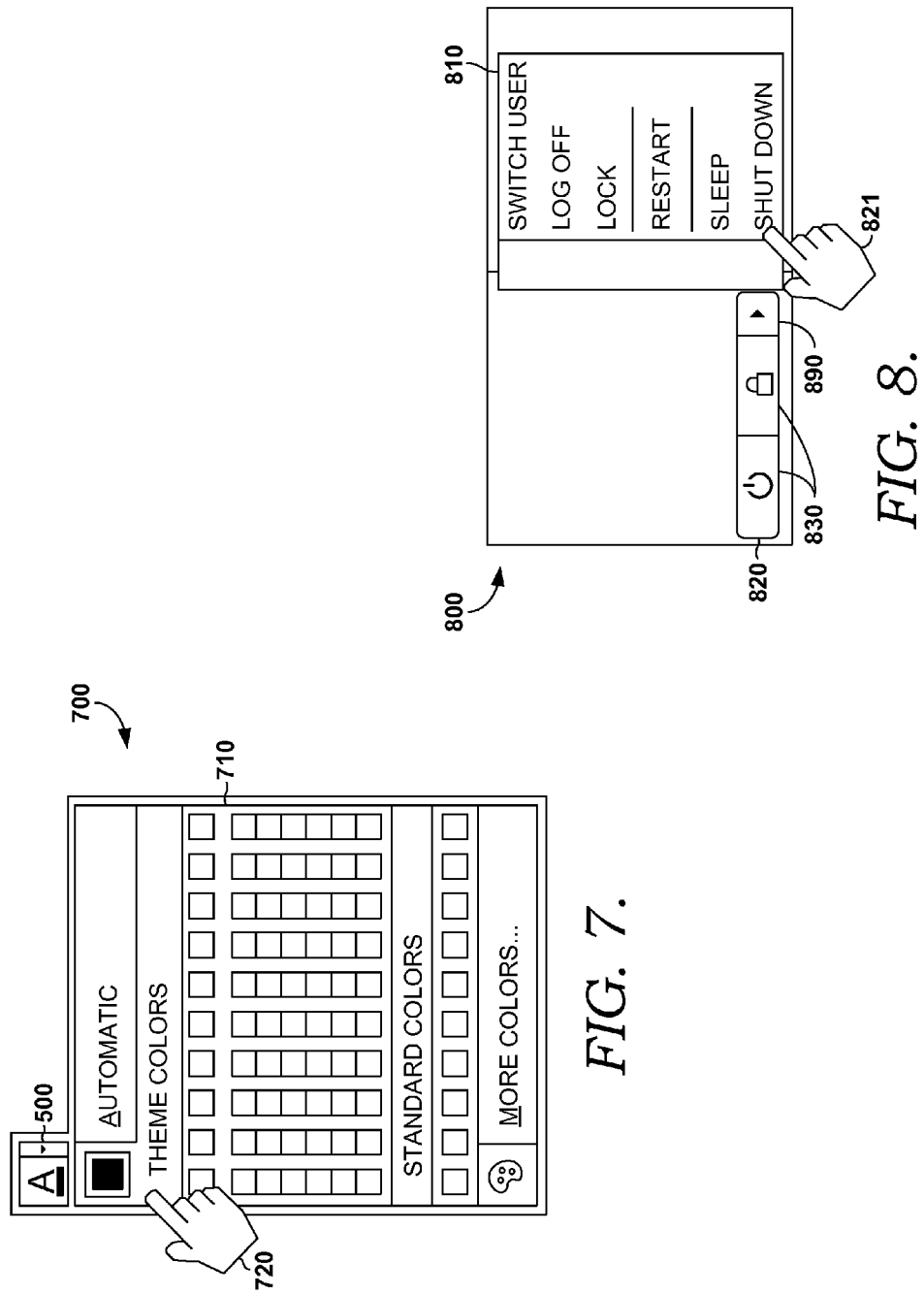

ACCESSING A MENU UTILIZING A DRAG-OPERATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Presently, operating systems provide a variety of utilities that assist in opening display areas within a GUI being presented at a display component (e.g., computer monitor, screen on a mobile device, and the like). Frequently, a split-button control is used to assist in opening a display area, or menu, along with providing functionality. A common design of a split-button is a combination of two of more buttons in a single control, where a primary button allows for initiation of a principle action while a secondary button allows for surfacing a menu of selectable options that relate to the principle action. For instance, a split-button may be a text-color control such that actuating the primary button applies a currently selected color to text within a document-editing application while actuating the secondary button surfaces a pop-up menu that offers more color choices that may be set as the currently selected color.

However, because the secondary button that opens a display area, or menu, is not often actuated, it is reduced in size to decrease clutter on the GUI. Accordingly, on a touch-input device (e.g., a touchscreen display), the secondary button is difficult to actuate. That is, it is unlikely a user will accurately actuate the small pixel area associated with the secondary button with the large contact area created by a pad of the user's finger on the touchscreen display. Further, no mechanism allows for a user to preview which button is selected for actuation before the actual actuation occurs at the touchscreen device—in comparison to highlighting a button when a cursor tool is hovering thereover. Still further, the act of actuation on a touchscreen display is clumsy (e.g., moving a user's entire arm to provide the actuation), thus, creating a wide variability of where on the touchscreen device the actuation will occur, as opposed to where the actuation is intended. As such, employing an intuitive technique for selecting the secondary button from a touchscreen display while drawing the secondary button in a reduced size on the GUI would enhance a user's experience accessing a menu from a top-level control button.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention provide computer-readable media having computer-executable instructions embodied thereon, a computer system, and computerized methods for accessing a menu upon actuating a top-level control button with an appropriate user-initiated input at a touchscreen display. In particular, intuitive techniques for invoking a presentation action (e.g., rendering a menu) by applying a drag-operation at the top-level control button, are provided.

Initially, a user-initiated input applied at a top-level control button is detected (e.g., detecting an actuation location of the user-initiated input within a command region of the touchscreen display associated with the top-level control button). Typically, the top-level control button comprises a visual element, or icon, designed to express a representation of a principle action at a GUI. A determination of whether the user-initiated input is a drag-operation or a tap-type operation is performed. The user-initiated input is recognized as a drag-operation if a distance of an uninterrupted drag-movement at the touchscreen display is greater than a threshold distance in a particular radial direction from the location of actuation of the user-initiated input. In an exemplary embodiment, a set of trigger boundaries is established at threshold distances in Cartesianal directions from the top-level control button. When a release location of the uninterrupted drag-movement is beyond one of the set of trigger boundaries, the drag-operation is identified and a presentation action is invoked. In one instance, the threshold distances are based, in part, on the system metrics of the touchscreen display (e.g., screen size, pixel density, parameters of the touchscreen display, or resolution of the GUI). The user-initiated input may be recognized as a tap-type operation if the uninterrupted drag-movement at the touchscreen display fails to overcome the set of trigger boundaries. Accordingly, the principal action mapped to the top-level control button is invoked (e.g., amending content within a document, editing text, surfacing an application, etc.). In indication of invoking the presentation action (e.g., revealing a menu with a list of selectable options) or the principle action (e.g., visibly manipulating content) may be rendered at the GUI.

BRIEF DESCRIPTION OF THE DRAWINGS

The present invention is described in detail below with reference to the attached drawing figures, wherein:

FIGS. 5-11 are progressive actuation displays illustrating stages of revealing a menu upon applying a drag-operation to a top-level control button, in accordance with embodiments of the present invention.

DETAILED DESCRIPTION

Figure 1:
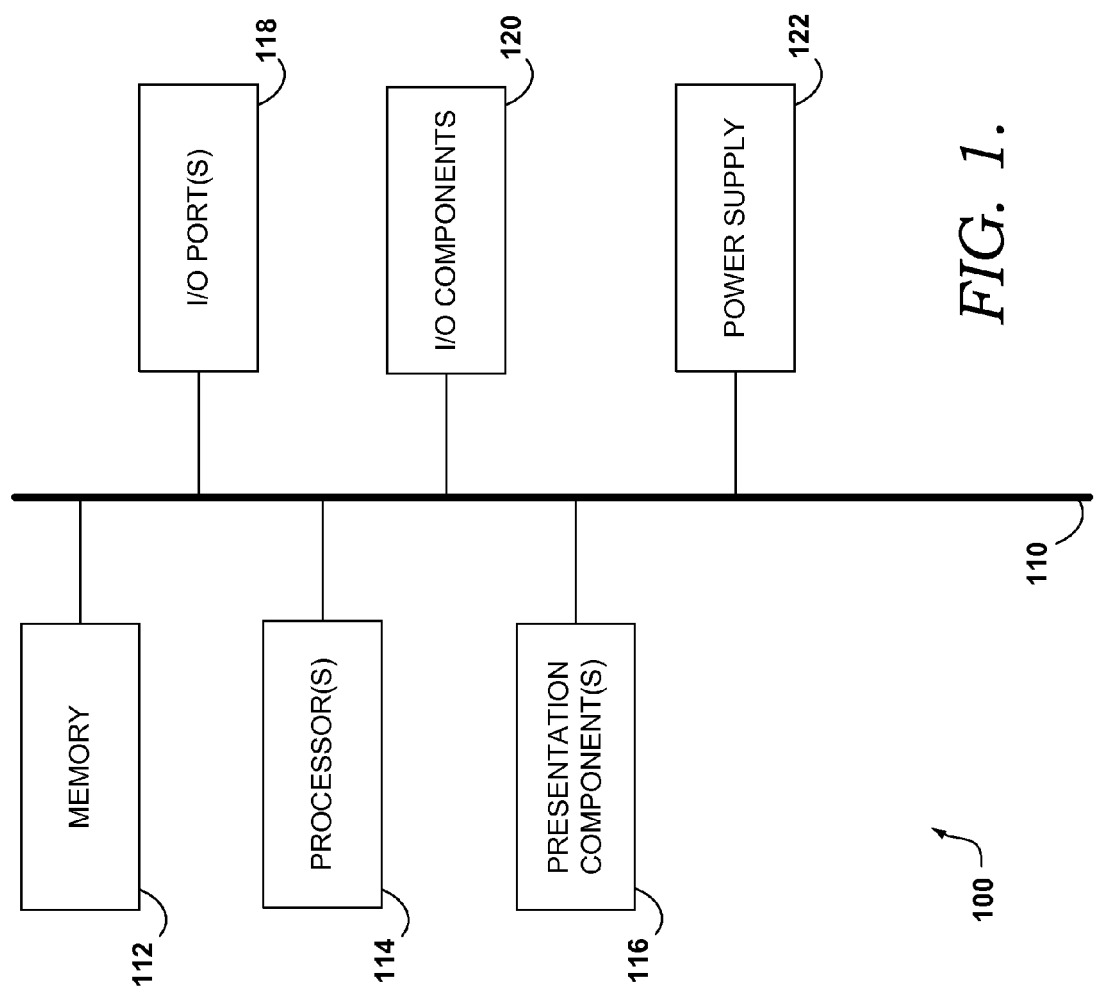
FIG. 1 is a block diagram of an exemplary computing environment suitable for use in implementing embodiments of the present invention.

The subject matter is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide computer-readable media having computer-executable instructions embodied thereon, a computer system, and computerized methods for accessing a menu at a top-level control button by recognizing a user-initiated input as a drag-operation based on a distance of an uninterrupted drag-movement from a location of actuation within the top-level control button.

Accordingly, in one aspect, the embodiments of the present invention provide one or more computer-readable media having computer-executable instructions embodied thereon that, when executed, perform a method for initiating a presentation action utilizing a drag-operation on a graphical user interface (GUI) rendered at a touchscreen display. Initially, the method includes detecting a user-initiated input applied at a top-level control button. The user-initiated input is recognized as a drag-operation by disambiguating the drag-operation from a tap-type operation. In an exemplary embodiment, disambiguation is based on a distance of an uninterrupted drag-movement from a location of actuation of the user-initiated input at the touchscreen display. Incident to recognizing that the drag-operation is applied at the top-level control button, the presentation action is invoked. Typically, the presentation action is mapped to the top-level control button and includes revealing a menu with selectable options. Dissimilarly, when the tap-type operation is applied to the top-level control button, a principal action mapped to the top-level control button is invoked. An indication of the presentation action or the principle action may be rendered at the GUI.

In another aspect, a computerized method for accessing a menu associated with a top-level control button is provided. In embodiments, the method includes, in part, detecting a location of actuation of a user-initiated input at a touchscreen component and accessing system metrics. Typically, the location of actuation indicates the top-level control button, and the system metrics are based on, in part, parameters of the touchscreen component. A process for constructing a first set of trigger boundaries and a second set of trigger boundaries may be performed by deriving the trigger boundaries from the system metrics. In one instance, deriving includes, but is not limited to, establishing the first set of trigger boundaries at a first threshold distance in at least one radial direction from the location of actuation and establishing the second set of trigger boundaries at a second threshold distance in at least one radial direction from the location of actuation. The method may further include detecting a drag-operation within the user-initiated input. Generally, the drag-operation includes an uninterrupted drag-movement from the location of actuation at the touchscreen display. If the drag-movement intersects one of the first set of trigger boundaries, a presentation action mapped to the top-level control button is invoked. By way of example, invoking a presentation action includes accessing a menu. If the drag-movement intersects one of the second set of trigger boundaries, an alternate action that is unrelated to a principle action mapped to the top-level control button is invoked. By way of example, invoking the alternate action includes relocating a presentation of the top-level control button on the touchscreen display. Otherwise the principal action mapped to the top-level control button is invoked. An indication of invoking the presentation action, the alternate action, or the principle action may be surfaced at a GUI rendered at the touchscreen display.

In yet another aspect, embodiments of the present invention relate to a computer system embodied on one or more computer storage-media having computer-executable instructions provided thereon for presenting a menu associated with a top-level control button upon receiving an indication of a user-initiated drag-operation applied thereto. In embodiments, the computer system includes one or more of the following tangible components: an input device, a processing component, a presentation component, an operating system, and an application component. The input device receives a user-initiated input applied at the top-level control button presented at a GUI. Typically, the input device is capable of accepting multi-directional inputs. The processing component detects a distance of an uninterrupted drag-movement from a location of actuation of the user-initiated input, as provided by the input device. Additionally, the processing component may recognize the user-initiated input as a drag-operation upon the distance meeting a threshold distance in a predefined Cartesianal direction. The presentation component renders a menu, mapped to the top-level control button, that represents the presentation action at the GUI. The operating system, embodied on the processing component, provides system metrics mapped to the top-level control button. Often, the system metrics dictate the threshold distance and predefined Cartesianal direction upon actuation of the top-level control button. The application component, running on the operating system, may be manipulated by the user-initiated input applied at the top-level control button.

Generally, embodiments of the present invention relate to recognizing a user-initiated input on a touchscreen display, or other tactile-input device, as a drag-operation or a tap-type operation. As discussed above, in one instance, the drag-operation is disambiguated from the tap-type operation based on a distance of uninterrupted drag-movement. As used herein, the phrase "uninterrupted drag-movement" is not meant to be limiting and may encompass any constant sweep, quasi-continuous input, or recursive chain of inputs that replicate a dragging contact across a surface. In one instance, the uninterrupted drag-movement may include contact between a physical object (e.g., stylus or portion of a finger) and the touchscreen display within a command region of the top-level control button and a drag of the physical object across the touchscreen display from the location of actuation to a location of release.

Although several different methods for generating an uninterrupted drag-movement have been described above, it should be understood and appreciated by those of ordinary skill in the art that various other drag-like inputs applied to a touchscreen component are contemplated herein as an uninterrupted drag-movement, and that embodiments of the present invention are not limited to those methods shown and described. For instance, other uninterrupted drag-movements that identify the user-initiated input as a drag-operation are discussed more fully below with reference to FIGS. 5-11.

Having briefly described an overview of embodiments of the present invention and some of the window states featured therein, an exemplary operating environment suitable for implementing the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular task, or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave, or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
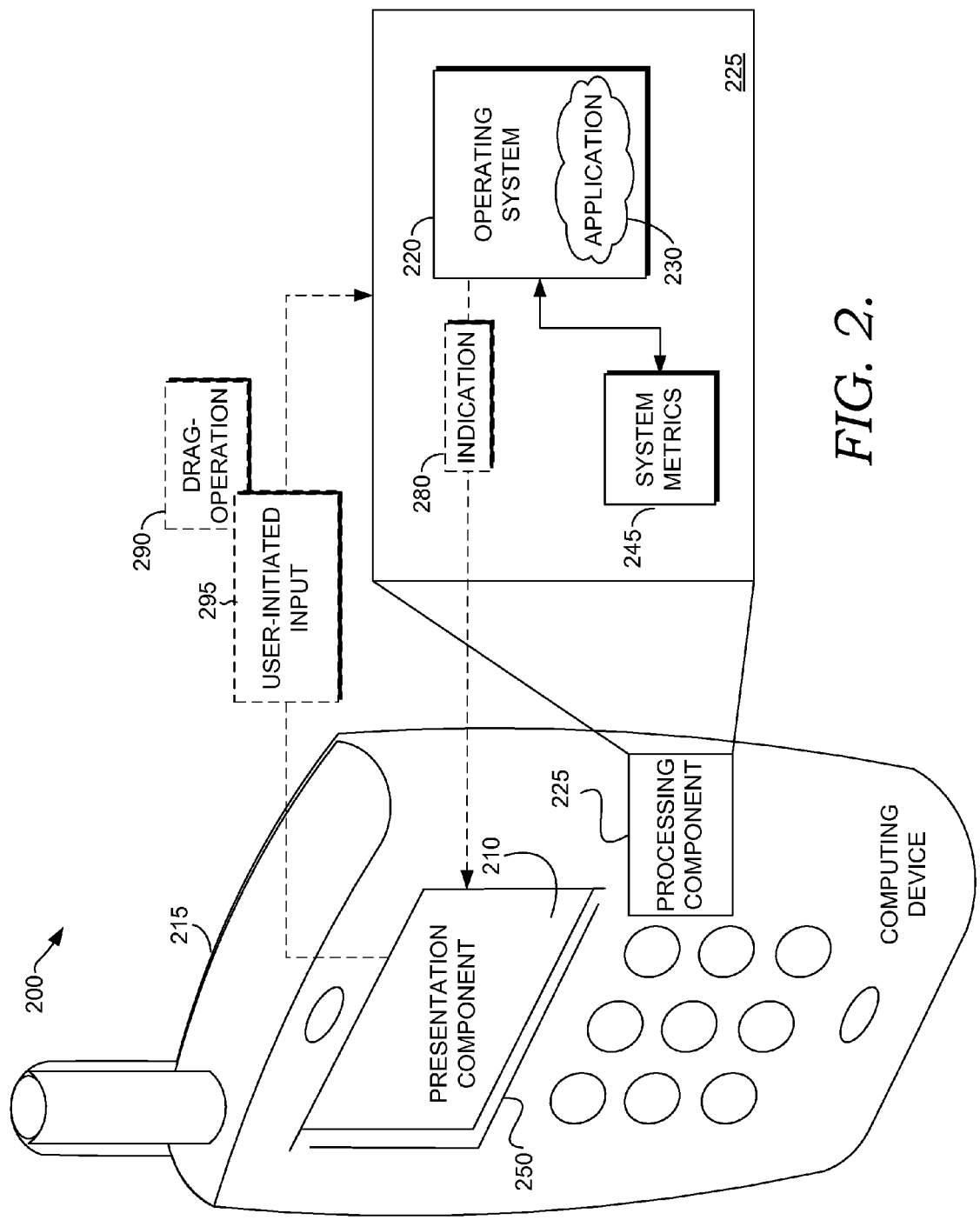
FIG. 2 is a schematic diagram of an exemplary system architecture suitable for use in implementing embodiments of the present invention, in accordance with an embodiment of the present invention.

Turning now to FIG. 2, a schematic diagram of an exemplary system architecture 200 suitable for use in implementing embodiments of the present invention is shown, in accordance with an embodiment of the present invention It will be understood and appreciated by those of ordinary skill in the art that the exemplary system architecture 200 shown in FIG. 2 is merely an example of one suitable computing environment and is not intended to suggest any limitation as to the scope of use or functionality of the present invention. Neither should the exemplary system architecture 200 be interpreted as having any dependency or requirement related to any single component or combination of components illustrated therein.

Further, logic within the operating system 220 supporting the exemplary system architecture 200 may be embodied on an internal processing component 225 to a computing device 215, provided from a distributed computing environment, such as a remote server (not shown), or any combination thereof. In embodiments of the invention that are practiced in distributed computing environments, logic communication is linked through appropriate connections. These connections may be wired or wireless. Examples of particular wired embodiments, within the scope of the present invention, include USB connections and cable connections. Examples of particular wireless embodiments, within the scope of the present invention, include a near-range wireless network and radio-frequency technology. It should be understood and appreciated that the designation of "near-range wireless network" is not meant to be limiting, and should be interpreted broadly to include at least the following technologies: negotiated wireless peripheral (NWP) devices; short-range wireless air interference networks (e.g., wireless personal area network (wPAN), wireless local area network (wLAN), wireless wide area network (wWAN), Bluetooth™, and the like); wireless peer-to-peer communication (e.g., Ultra Wideband); and any protocol that supports wireless communication of data between devices. Additionally, persons familiar with the field of the invention will realize that a near-range wireless network may be practiced by various data-transfer methods (e.g., satellite transmission, telecommunications network, etc.). Therefore it is emphasized that embodiments of the connections between the computing device 215 and the remote server, for instance, are not limited by the examples described, but embrace a wide variety of methods of communications.

Exemplary system architecture 200 includes the computing device 215 for, in part, supporting operation of the processing component 225. In an exemplary embodiment, where the computing device 215 is a mobile device for instance, a presentation component 250 (e.g., a touchscreen display) may be disposed on the computing device 215. The computing device 215 may take the form of various types of computing devices. By way of example only, the computing device 215 may be a personal computing device (e.g., computing device 100 of FIG. 1), handheld device (e.g., personal digital assistant), a mobile device (e.g., laptop computer, cell phone, media player), consumer electronic device, various servers, and the like. Additionally, the computing device may comprise two or more electronic devices configured to share information therebetween.

In embodiments, as discussed above, the computing device 215 includes the presentation component 250, an input device 210, and the processing component 225 (e.g., hardware) with an operating system 220 installed thereon. The computing device 215 is configured to present a GUI display on the presentation component 250. The presentation component, which may be operably coupled to the processing component 225, may be configured as any display device that is capable of presenting information to a user, such as a monitor, electronic display panel, touch-screen, liquid crystal display (LCD), plasma screen, one or more light-emitting diodes (LED), incandescent bulbs, a laser, an electroluminescent light source, a chemical light, a flexible light wire, and/or fluorescent light, or any other display type, or may comprise a reflective surface upon which the visual information is projected. In one exemplary embodiment, the GUI display rendered by the presentation component is configured to present a top-level control button (not shown) associated with an application 230 and/or to reveal a menu (not shown) as one result of invoking the presentation action at the top-level control button. In another exemplary embodiment, the GUI display is capable of rendering an indication of invoking the presentation action, the principle action, other actions, or any combination thereof.

The input device 210 is provided to accept user-initiated input(s) 295 affecting, among other things, invoking a particular action mapped to the top-level control button. In an exemplary embodiment, the input device 210 receives the user-initiated inputs 295 directed at one or more top-level control buttons rendered on the GUI. Illustrative devices include a touchscreen display (e.g., contemporaneously employed as the presentation component 250), the I/O components 120 of FIG. 1, or any other component capable of receiving the user-initiated input 295 that includes a directional component and communicating an indication of that input to the processing component 225. By way of example only, the input device 210 may determine a coordinate location of where the user-initiated input 295 initiates contact therewith (e.g., location of actuation) and a coordinate location of where the user-initiated input 295 terminates contact therewith (e.g., location of release), with reference to items rendered at the GUI. These coordinate locations may be compared to determine a distance of an uninterrupted drag-movement and a direction thereof, as discussed more fully below.

Although several differing configurations of the input device 210 have been described above, it should be understood and appreciated by those of ordinary skill in the art that various types of input devices that receive inputs from physical contact or otherwise may be employed as the input device 210, and that embodiments of the present invention are not limited to those input devices 210 that are shown and described as being incorporated into the presentation component 250. For instance, the presentation component 250 may be a monitor operably coupled to a computer (e.g., computing device 215), while the input device 210 may be a stand-alone capacitive touchscreen or trackball that is in wireless communication (discussed above) with the computer. However, for the sake of brevity and clarity, the input device 210 and the presentation component 250 will hereinafter be referred to jointly as a touchscreen display or touchscreen component, which is a touchscreen that offers the functionality of both a display and an input element in a single unit.

The operating system (OS) 220 refers generally to the software that manages the sharing of the resources of the processing component and provides programmers with an interface used to access those resources. In operation, the operating system 220 interprets system data and detects the user-initiated inputs 295 (e.g., via the input device 210), and responds by executing such processes as the following, in no particular order: detecting a location of actuation of a user-initiated input 295 at the input device 210; accessing system metrics 245; where the system metrics 245 are based on, in part, parameters of the presentation component 250; constructing a first set of trigger boundaries and/or a second set of trigger boundaries derived from the system metrics 245; and detecting a drag-operation 290 within the user-initiated input 295, where the drag-operation comprises an uninterrupted drag-movement from the location of actuation.

Utilizing heuristics/rules available to the processing component 225, the operating system 220 may perform a variety of logical determinations to identify which action should be taken based on the user-initiated input 295. For instance, if the drag-movement intersects one of the first set of trigger boundaries, a presentation action mapped to the top-level control button is invoked. In another instance, if the drag-movement intersects one of the second set of trigger boundaries, an alternate action that is unrelated to a principle action mapped to the top-level control button is invoked. In yet another instance, where the drag-related heuristics are not satisfied, the principal action mapped to the top-level control button is invoked. In further embodiments, the operating system is configured to render an indication 280 of invoking at least one of the presentation action, the alternate action, or the principle action at a GUI. In a particular instance, rendering the indication 280 includes surfacing a menu mapped to the top-level control button at the touchscreen component.

In an exemplary embodiment, the operating system 220 runs on the processing component 225 and supports execution of one or more of applications, including the application 230. In other embodiment, the operating system 220 and/or the application 230 may partially or fully reside on a remotely located computing device (e.g., on another operating system, on a server located via a web address, etc.). In various embodiments, the operating system 220 computes a distance and direction of the uninterrupted drag-movement of the drag-operation 290, upon receiving the user-initiated input 295. Although the user-initiated input is received from the touchscreen component, illustrated in FIG. 2, it should be understood and appreciated that other inputs from various other input devices (e.g., a remote tactile-input panel) may be received and interpreted by the operating system 220; accordingly, the scope of the present invention is limited to the inputs and input devices described herein. If the distance and/or direction fail to satisfy the system metrics 245, which are accessible to the operating system 220, the user-initiated input 295 may be considered a tap-type operation. In such case, a principle action mapped to the top-level control button is likely automatically invoked.

Typically, the principle action, as discussed more fully below with reference to FIGS. 5-11, affects one or more aspects of the application 230 or content therein (e.g., documents, text, media, and the like). Generally, the application 230 is any program that may be launched and manipulated by the operating system 220. As discussed above, the application 230 manages content published on the GUI. In addition, the application 230 may govern the design of the top-level control button and which top-level control buttons are to be surfaced. In one instance, the top-level control button includes a visual element, or icon, that is drawn to express an intuitive representation of the principle action mapped thereto. In another instance, the application 230 may govern the design of a menu that reveals a list of selectable options that, when selected, influence the application 230, either directly or indirectly. In yet another embodiment, the application 230 may govern the transformation of the top-level control button (e.g., to a split-button) incident to detecting the user-initiated input 295. Further, the application 230 may be developed or customized such that user-preferred control designs of the top-level control buttons and so forth are implemented upon execution of the application 230. Though illustrated as a single, independent component, the application 230 may, in fact, be a plurality of applications, for instance, a collection of interrelated applications or various remotely accessible applications.

This operating-system structure of the operating system 220 is but one example of a suitable structure that may be run on the processing component 225, and is not intended to suggest any limitation as to the scope of use or functionality of the invention. Neither should the illustrated operating system 220 be interpreted as having any dependency or requirement relating to any one or combination of receiving the user-initiated input 295 or providing the indication 280 as illustrated. Further, the application 230 may be integrated into the operating system 220 or the processing component 225 and may be exemplary in nature and in number, and should not be construed as limiting.

Any number of components may be employed to achieve the desired functionality within the scope of embodiments of the present invention. Although the various components of FIG. 2 are shown with lines for the sake of clarity, in reality, delineating various components/elements is not so clear, and metaphorically, the lines would more accurately be grey or fuzzy. Further, although some components and devices of FIG. 2 are depicted as single blocks, the depictions are exemplary in nature and in number and are not to be construed as limiting (e.g., although only one presentation component 250 is shown, many more may be operably coupled to the computing device 215, thereby functioning in conjunction to present the GUI).

Figure 3:
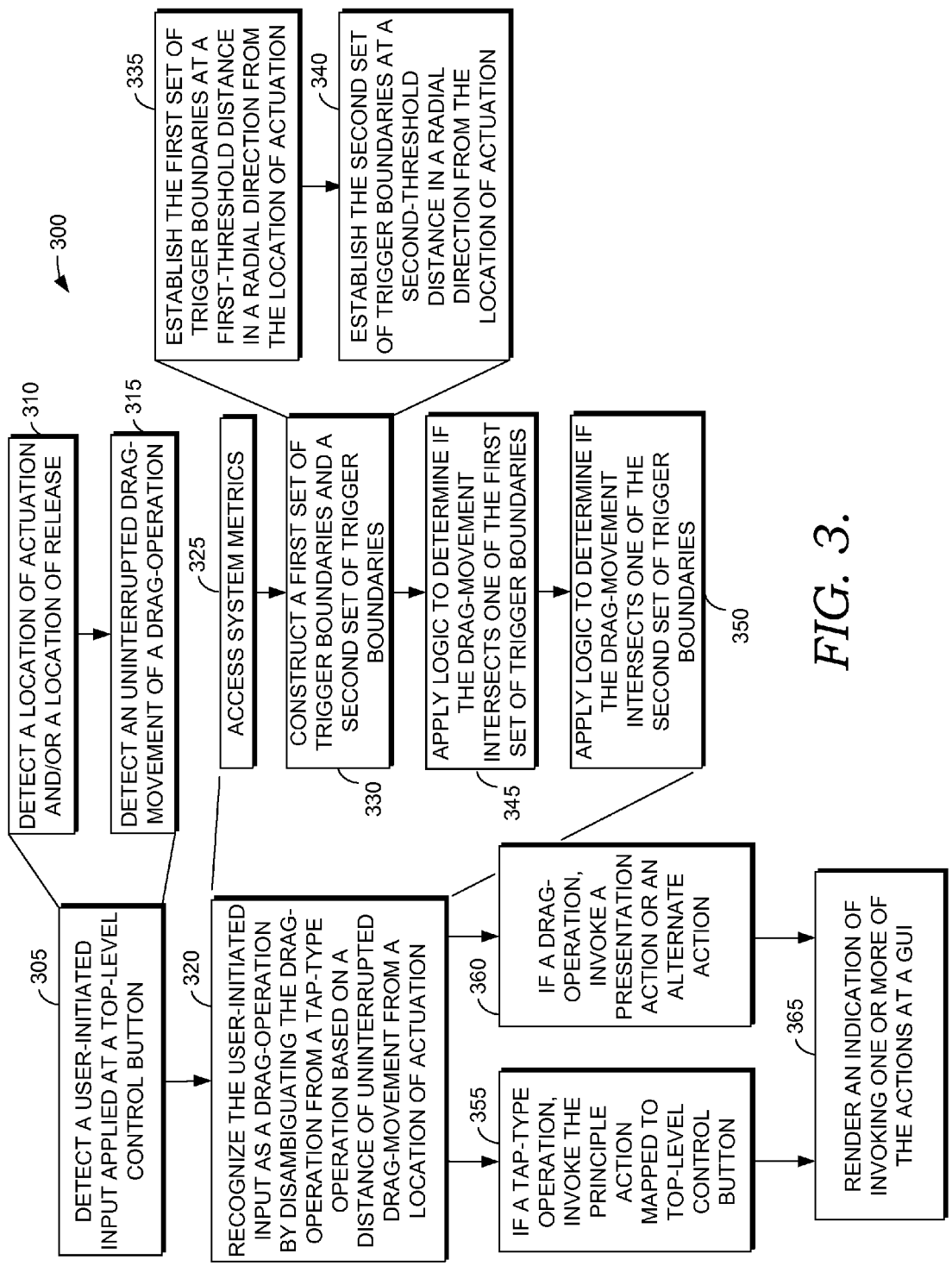
FIG. 3 is a flow diagram illustrating an overall method for initiating a presentation action utilizing a drag-operation on a graphical user interface (GUI) rendered at a touchscreen display, in accordance with an embodiment of the present invention.

Turning now to FIG. 3, a flow diagram is shown that illustrates an overall method for initiating a presentation action utilizing a drag-operation on a graphical user interface (GUI) rendered at a touchscreen display, in accordance with an embodiment of the present invention. Initially, a user-initiated input applied at a top-level control button is detected, as indicated at block 305. In embodiments, the top-level control button is surfaced on the GUI rendered by the presentation component (e.g., utilizing the presentation component 250 of FIG. 2) at the direction of an application (e.g., utilizing the application 230 of FIG. 2). In other embodiments, the user-initiated input, and aspects thereof, are detected at an input device (e.g., utilizing the input device 210 of FIG. 2). These detected aspects of the user-initiated input may include a location of an actuation and/or a location of release of the actuation within an area defined by a touchscreen display (e.g., input device), as indicated at block 310. In other instances, these detected aspects may include an uninterrupted drag-movement applied at the touchscreen display, as indicated at block 315.

Based on these detected aspects of the user-initiated input, the input may be recognized as a drag-operation, as indicated at block 320. In an exemplary embodiment, recognition is performed, in part, by disambiguating the drag-operation from a tap-type operation utilizing a distance of the detected uninterrupted drag-movement. In one instance, the uninterrupted drag-movement is calculated from comparing Cartesianal coordinates of the location of actuation with those of the location of release of the uninterrupted drag-movement. In another instance, a timer mechanism is utilized to determine whether a discontinuity in the uninterrupted drag-movement is an allowable pause (e.g., an absence of input below a threshold time period), thereby considering a drag-movement after the pause as part of the initial uninterrupted drag-movement, or a release of actuation (e.g., an absence of input above the threshold time period).

In embodiments, the process of recognizing includes accessing system metrics (see block 325) and constructing a first set of trigger boundaries and a second set of trigger boundaries derived from the system metrics (see block 330). Typically, the system metrics are based on, in part, parameters of the touchscreen display, screen size, pixel density, and/or resolution of the GUI. The process of constructing may include, but is not limited to, the following steps: establishing the first set of trigger boundaries at a first-threshold distance in at least one radial direction from the location of actuation (see block 335); and establishing the second set of trigger boundaries at a second-threshold distance in at least one radial direction from the location of actuation (see block 340). In one instance, with reference to FIG. 4, the first set of trigger boundaries includes establishing one or more vertical trigger lines 440 each at a horizontal threshold distance 445 from the actuation location 425, while the second set of trigger boundaries includes establishing one or more horizontal trigger lines 450 each at a vertical threshold distance 455 from the actuation location 425. Often the horizontal threshold distance 445 is distinct from the vertical threshold distance 455.

Figure 4:
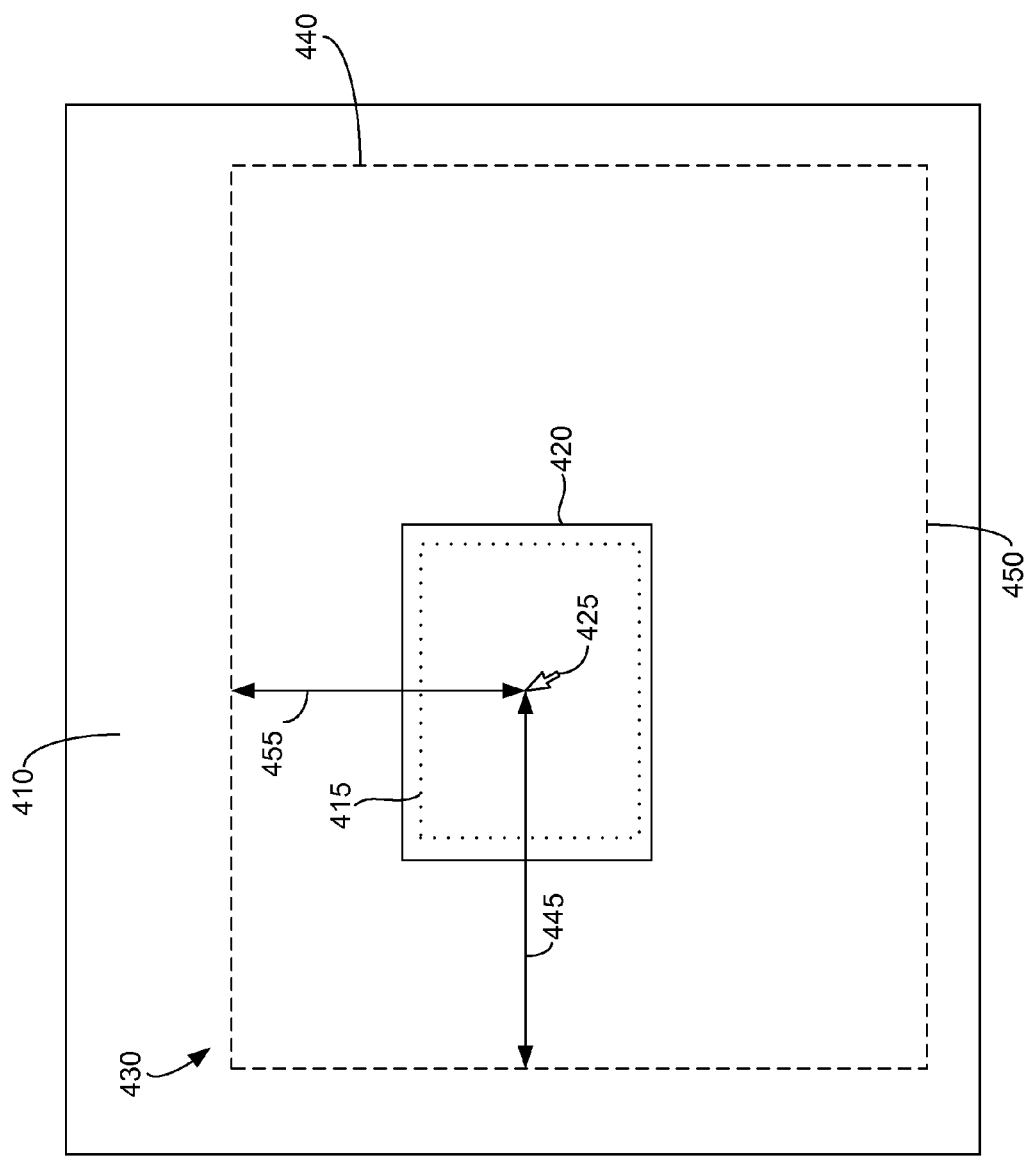
FIG. 4 is an diagrammatic view of an exemplary top-level control button provided with a set of trigger boundaries that assist in determining whether a user-initiated input includes the drag-operation, in accordance with an embodiment of the present invention.

With continued reference to FIG. 4, which shows a diagrammatic view of an exemplary top-level control button 420 provided with a set of trigger boundaries 430 that assist in determining whether a user-initiated input includes the drag-operation, a touchscreen display 400 is depicted. The touchscreen display 400 is configured to, at least, render a GUI 410 that includes the top-level control button 420 and to receive inputs (e.g., user-initiated input) thereon. In embodiments, the user-initiated input is a contact/sweep provided by a physical object at a surface of the touchscreen display 400. Generally, the top-level control button 420, as well as those actions mapped thereto, are indicated upon the location of actuation 425 of the user-initiated input occurring within a command region 415 associated with the top-level control button. That is, upon detecting the location of actuation 425 within the command region 415 constructed by the touchscreen display 400, the appropriate action mapped to the top-level control button 420 is identified and invoked upon determining key aspects of the user-initiated input (e.g., distance and direction of a drag-movement).

As illustrated, the command region 415 may substantially overlay the top-level control button 420. However, embodiments of the present invention contemplate other configurations of the command region 415 in relation to the top-level control button 420, such as overlaying a portion of the top-level control button 420 or being constructed in a location removed from the top-level control button 420. Further, the phrase "top-level control button" is not meant to be limiting but may include any style of button, such as an option button, or any type of graphical user interface widget that allows a user to invoke a principle action therefrom (i.e., a single interaction point for the direct manipulation of a given kind of data).

With consideration of both FIGS. 3 and 4, although the set of trigger boundaries 430 is described and illustrated as being comprised of a first set (e.g., vertical trigger lines 440) and a second set (e.g., horizontal trigger lines 450) of trigger boundaries, it should be understood and appreciated by those of ordinary skill in the art that other numbers and types of suitable trigger boundaries that assist in disambiguating a drag-operation from a tap-type operation may be used, and that embodiments of the present invention are not limited to those trigger boundaries described herein. For instance, a plurality of trigger boundaries may be constructed, where each is defined by a unique distance and radial direction in relation to the location of actuation, the top-level control button, or one or more edges of the touchscreen display. In an exemplary embodiment, the set of trigger boundaries is established based on system metrics, as discussed above. Accordingly, variations in the system metrics may directly and/or dynamically influence the construction of the trigger boundaries. By way of example only, if the pixel density of touchscreen display is increased, the threshold distance of the trigger boundaries in relation to the location of actuation may dynamically decrease in response.

Referring back to FIG. 3, upon constructing the first set of trigger boundaries, logic may be applied to determine whether the drag-movement intersects one or more of the trigger boundaries within the first set, as indicated at block 345. If the drag-movement intersects one of the first set of trigger boundaries, a presentation action (e.g., accessing a menu) mapped to the top-level control button may be invoked. As indicated at block 350, logic may be applied to determine whether the drag-movement intersects one or more of the trigger boundaries within the second set. If the drag-movement intersects one of the second set of trigger boundaries, an alternate action (e.g., relocating the top-level control button on the GUI), which is typically unrelated to a principle action mapped to the top-level control button, may be invoked. The invocation of these actions above is depicted in block 360. If aspects of the user-initiated input indicate that a drag-movement did not occur, or failed to cross a trigger boundary, the user-initiated action is recognized as a tap-type operation. Accordingly, as indicated at block 355, a principal action mapped to the top-level control button is invoked. Indications that one or more of the actions, discussed above, are invoked may be rendered at the GUI of the touchscreen display, or on any other presentation component, as indicated at block 365.

Turning now to FIGS. 5-11, progressive actuation displays are shown that illustrate stages of revealing a menu upon applying a drag-operation to a top-level control button, in accordance with embodiments of the present invention. Initially, with reference to FIG. 5, an exemplary top-level control button 500 that has a command region 510 for detecting actuations is depicted. In addition, the top-level control button 500 includes a visual element 520 designed to express a representation of a principle action that is invoked by selecting the top-level control button 500. In one instance, the selection is made by a tap-type operation (e.g., click-and-release gesture at the command region 510). Further, as illustrated in this exemplary top-level control button 500, the visual element 520 resides within the command region 510.

Figure 6:
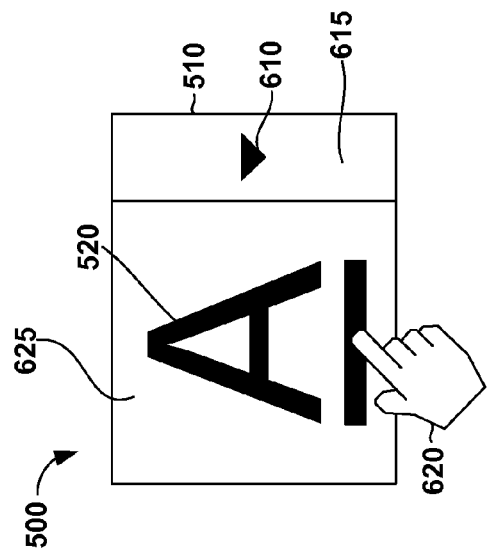
Figure 5:
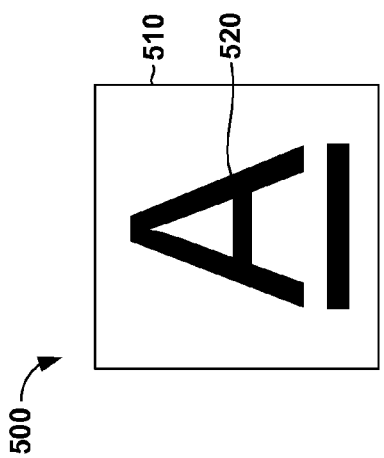

Referring to FIG. 6, the top-level control button 500 is depicted in a modified state. Typically, the modified state is surfaced upon receiving an indication of a user-initiated input 620 that has a location of actuation within the command region 510. Consequently, the default design of the top-level control button 500 may be hidden or obfuscated.

In the embodiment illustrated, the modified state is a split-button that exposes the option of invoking a presentation action, as well as the principle action, associated with the top-level control button 500. In this embodiment, exposing the option of invoking a presentation action is reflected by dividing the top-level control button 500 into an icon portion 625 that comprises the visual element 520, and a split portion 615 that comprises an indicator 610 that exposes functionality of invoking the presentation action. As depicted in FIG. 6, the icon portion 625 and the split portion 615 are spatially orientated in a side-by-side configuration. However, the icon portion 625 and the split portion 615 may by drawn in any adjacent configuration, or even as individual and distinct icons.

With reference to FIG. 7, the top-level control button 500 is depicted with a menu 700 revealed in response to a drag-operation. The drag-operation is identified upon deriving a distance of uninterrupted drag-movement between coordinates of an actuation location of the user-initiated input 620 of FIG. 6 and the coordinates of the release location of the user-initiated input 720 of FIG. 7, and determining the derived distance overcomes the predefined threshold distance. The menu 700 includes selectable options 710. In an exemplary embodiment, the selectable options 710 (e.g., options for colors to apply to content of a document) correspond to a principle action of the top-level control button 500 (e.g., applying a color to content). In addition, as depicted in FIG. 7, one radial direction of the drag-movement that invokes the presentation action is substantially, vertically downward.

In contrast, with reference to FIG. 8, an acceptable radial direction of drag-movement from an actuation point 821 of a user-initiated input 850 is substantially, horizontally to the right. This accepted direction, which satisfies the trigger boundaries, may be provided by an indicator 890 of a split-button 820. Further, the split-button 820 may include two or more top-level control buttons 830. Upon satisfying the trigger boundaries, a menu 810 may be revealed. In the embodiment illustrated, the menu 810 includes a tasklist and is revealed in a location adjoining the split-button 820. However, the menu 810 may be revealed in a location remote to, or separate from, the split-button 820.

Figure 9:
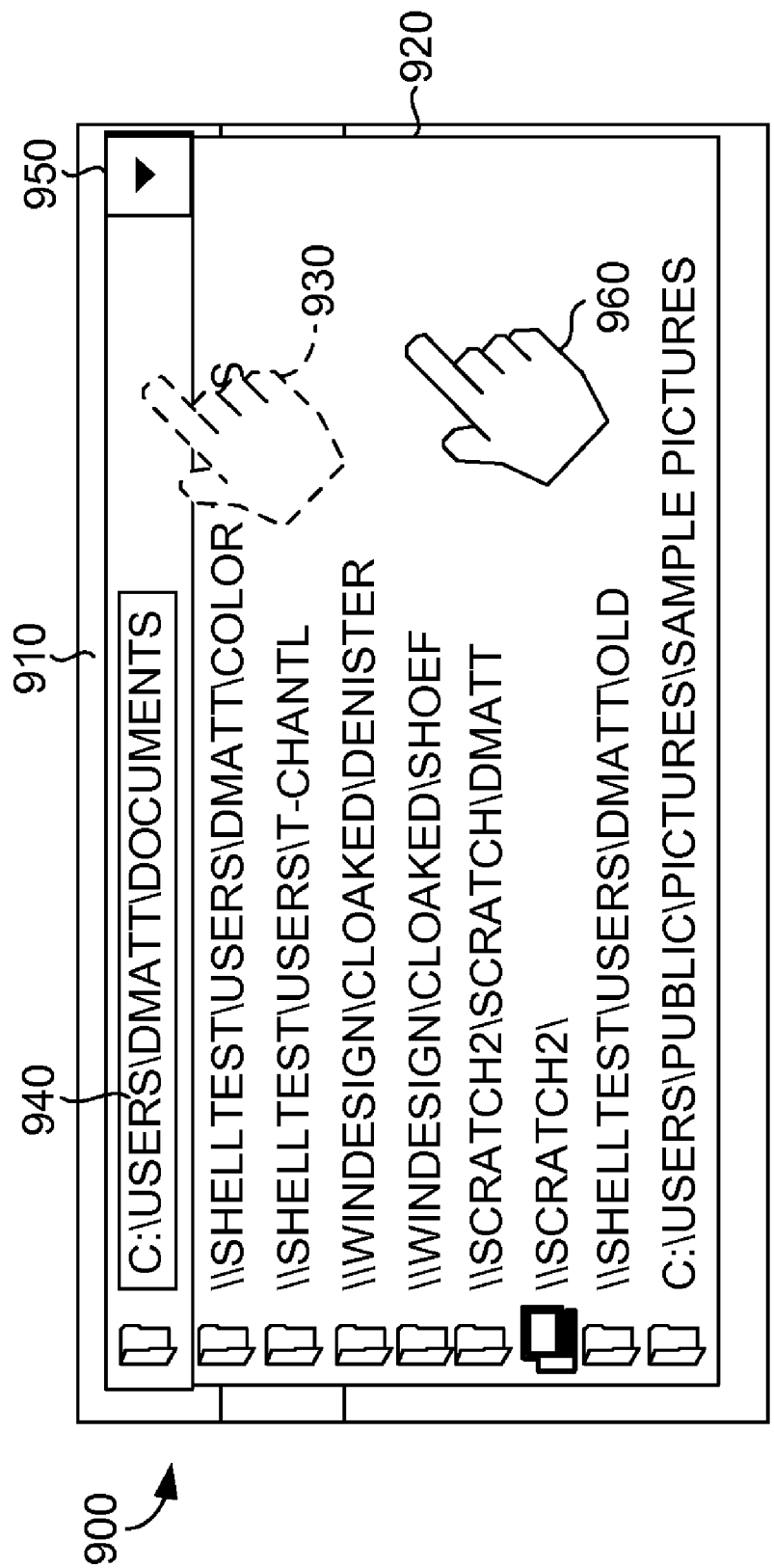

Turning to FIG. 9, a standard address bar 910 within a split portion 950 and a text portion 940 is illustrated at GUI 900, in accordance with an embodiment of the present invention. In this instance, a drag-movement from actuation location 930 to a location of release 960 of a user-initiated input may invoke a presentation action. In this embodiment, the presentation action mapped to the standard address bar 910 includes surfacing a drop-down menu 920 that provides access to recently used addresses. However, a tap-type actuation at the action location 930 may invoke a principle action mapped to the standard address bar 910. In one instance, the principle action may encompass initiating an editing command to modify text within the text portion 940 of the standard address bar 910.

With continued reference to FIG. 9, upon detecting a release of the uninterrupted drag-movement of the drag-operation (e.g., at the release location 960), the GUI 900 may maintain revealing the drop-down menu 920 at the GUI 900. Accordingly, the user may make a second user-initiated input indicating one of the selectable options, as detected by the touchscreen display. Upon indicating one of the selectable options, a corollary action to the principle action—typically associated with the selectable option indicated by the second user-initiated input—may be invoked. In this instance, the corollary action may be importing a selected recently used address into the text portion 940 for future web navigation. Upon selection of a selectable option in the drop-down menu 920, the menu 920 may be hidden and/or the top-level control button may revert from a split-button to its default design. The above-described technique for surfacing the menu 920, with reference to an address bar, may be similarly applied to a search box or any other text-entry tool that is associated with a manifest of other text entries (e.g., previously searched queries, frequently used documents, and the like).

Figure 11:
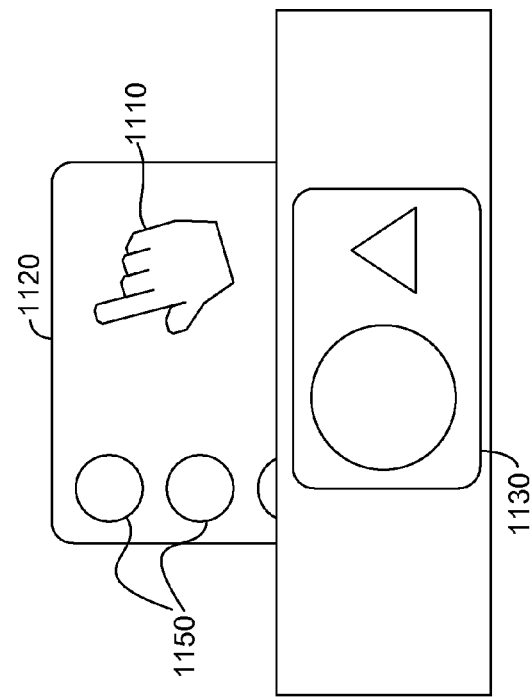
Figure 10:
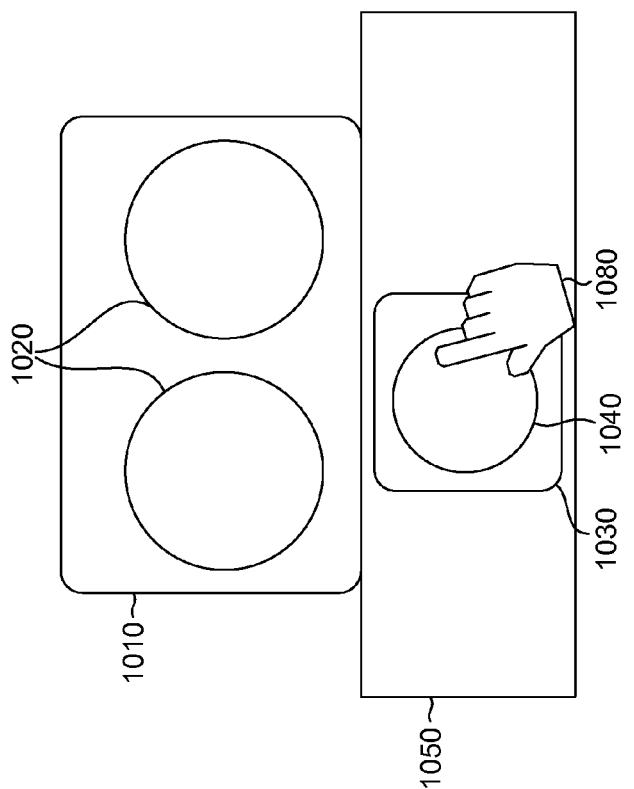

Referring now to FIGS. 10 and 11, a process for launching a main menu 1010 or a pop-up menu 1120 from a top-level control button 1030 on a taskbar 1050 will now be discussed, in accordance with an embodiment of the present invention. Initially, the top-level control button 1030 includes an icon 1040 that represents an application or other item. Typically, in this embodiment, the icon resides on the taskbar 1050. Upon receiving a tap-type actuation at an actuation location 1080, a principle action is invoked. In this case, the principle action that is mapped to the top-level control button 1030 may include launching an application mapped to the top-level control button 1030, or surfacing the main menu 1010. In one instance, the main menu may include a tasklist of selectable tasks 1020 related to the application mapped to the top-level control button 1030.

Upon detecting an indication of a tap-and-hold operation, the top-level control button 1030 may be reconfigured to a button 1130 of FIG. 11 that visually indicates the inherent functionality of allowing for invoking a presentation action from the top-level control button 1030. Invoking the presentation action may be accomplished by dragging a physical object across the surface of a touchscreen from the actuation location 1080 to a release location 1110. In one instance, invoking the presentation action includes at least one of revealing a menu with a complementary tasklist having selectable tasks that support the selectable tasks 1020 of the main menu 1010 associated with the application. In another instance, invoking the presentation action may include revealing the menu 1120 with a list of recently viewed documents 1150 that are accessible from the application.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well-adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer-storage media having computer-executable instructions embodied thereon that, when executed, perform a method for initiating a presentation action, alternate action, or principal action utilizing a drag-operation on a graphical user interface (GUI) rendered at a touchscreen display, the method comprising:
   detecting a user-initiated input applied at a top-level control button;
   providing a first set of trigger boundaries and a second set of trigger boundaries, wherein the first and second set of trigger boundaries are visually hidden from a user of the touchscreen display, wherein providing comprises:
   (1) establishing the first set of trigger boundaries at a first threshold distance in at least one radial direction from a location of actuation of the input; and
   (2) establishing the second set of trigger boundaries at a second threshold distance in at least one radial direction from location of actuation of the input;
   detecting a drag-operation within the user-initiated input, wherein the drag-operation comprises an uninterrupted drag-movement from the location of actuation at the touchscreen display to a location of release from the touchscreen display, wherein a distance and a radial direction of the drag-movement are determined as a function from the location of actuation;
   if the distance and the radial direction of the drag-movement intersects one of the first set of trigger boundaries, invoking a presentation action mapped to the top-level control button;
   if the distance and the radial direction of the drag-movement intersects one of the second set of trigger boundaries, invoking an alternate action, which is mapped to the top-level control button, that is unrelated to a principle action; and
   otherwise, invoking the principal action mapped to the top-level control button, wherein the presentation action, the alternate action, and the principal action each representing a distinct operation, one of which resulting from the input.

2. The media of claim 1, the method further comprising presenting, on the GUI, the top-level control button that comprises a visual element designed to express a representation of the principle action.

3. The media of claim 2, wherein detecting a user-initiated input at a top-level control button comprises detecting the actuation location of the user-initiated input within a command region associated with the top-level control button, wherein the visual element resides within the command region.

4. The media of claim 3, the method further comprising recognizing the user-initiated input is a drag-operation by disambiguating the drag-operation from a tap-type operation based on a distance of an uninterrupted drag-movement from a location of actuation of the user-initiated input at the touchscreen display.

5. The media of claim 4, wherein establishing the first set of trigger boundaries at a first threshold distance in at least one radial direction from the location of actuation comprises establishing one or more vertical trigger lines each at a horizontal threshold distance from the actuation location, and wherein establishing the second set of trigger boundaries at a second threshold distance in at least one radial direction from the location of actuation comprises establishing one or more horizontal trigger lines each at a vertical threshold distance from the actuation location, wherein the horizontal threshold distance is distinct from the vertical threshold distance.

6. The media of claim 5, the method further comprising dynamically varying the threshold distance of each of the set of trigger boundaries upon detecting a change in system metrics, wherein the vertical threshold distance and the horizontal threshold distance are based, in part, on the system metrics of the touchscreen display, and wherein the system metrics comprise at least one or more of screen size, pixel density, parameters of the touchscreen display, or resolution of the GUI.

7. The media of claim 6, wherein rendering an indication of the presentation action at the GUI comprises revealing a menu that comprises a list of selectable options, wherein the selectable options relate to the principle action.

8. The media of claim 7, the method further comprising:
   detecting the uninterrupted drag-movement of the drag-operation crossing one or more of the horizontal trigger lines; and
   revealing the menu at the GUI in spatial proximity to the top-level control button.

9. The media of claim 8, the method further comprising:
   detecting a release of the uninterrupted drag-movement of the drag-operation upon crossing one or more of the horizontal trigger lines;
   maintaining revealing the menu at the GUI;
   detecting a second user-initiated input indicating one of the selectable options; and
   invoking a corollary action to the principle action associated with the selectable option indicated by the second user-initiated input.

10. The media of claim 7, the method further comprising:
detecting the uninterrupted drag-movement of the drag-operation crossing one or more of the vertical trigger lines; and
invoking an alternate action that is unrelated to the principal action.

11. The media of claim 2, the method further comprising:
surfacing a split-button upon detecting a commencement of the user-initiated input, wherein the split-button exposes an option of invoking the presentation action; and
hiding the top-level control button.

12. The media of claim 11, wherein the split-button is divided into an icon portion that comprises the visual element designed to express the representation of the principle action, and a split portion that comprises an indicator that exposes functionality of invoking the presentation action, and wherein the icon portion and the split portion are spatially orientated in a side-by-side configuration.

13. The media of claim 4, wherein recognizing the user-initiated input as a drag-operation further comprises:
identifying contact between a physical object and the touchscreen display within the command region of the top-level control button;
detecting the uninterrupted drag-movement of the physical object across the touchscreen display from the location of actuation to a location of release;
determining the distance, measured in pixels, and a radial direction between the location of actuation and the location of release; and
comparing the distance against the threshold distance associated with one of the set of trigger boundaries selected from the set of trigger boundaries based on the determined radial direction.

14. The media of claim 1, wherein the top-level control button comprises an icon that represents an application, the icon resides on a taskbar, wherein the principle action that is mapped to the top-level control button comprises launching the application, and wherein invoking the presentation action comprises at least one of revealing a menu with a tasklist having selectable tasks associated with the application, or revealing a menu with a list of recently viewed documents that are accessible from the application.

15. A computer system embodied on one or more computer storage-media having computer-executable instructions provided thereon for presenting a menu associated with a top-level control button upon receiving an indication of a user-initiated drag-operation applied thereto, the system comprising:
an input device to receive a user-initiated input that has a location of actuation applied at the top-level control button presented at a GUI, wherein the input device is capable of accepting multi-directional inputs;
a processing component to detect a distance and radial direction of an uninterrupted drag-movement from the location of actuation of the user-initiated input, as provided by the input device, and to recognize the user-initiated input as a drag-operation upon the distance of the uninterrupted drag-movement meeting a threshold distance in a predefined Cartesianal direction, the processing component further capable of invoking the actions comprising:
(a) invoking a presentation action mapped to the top-level control button, if the distance and the radial direction of the drag-movement intersects one of a first set of trigger boundaries, wherein the first set of trigger boundaries are established at a first threshold distance from the location of actuation;
(b) invoking an alternate action, which is mapped to the top-level control button, that is unrelated to a principle action, if the distance and the radial direction of the drag-movement intersects one of a second set of trigger boundaries, wherein the second set of trigger boundaries are established at a second threshold distance from the location of actuation; and
(c) otherwise, invoking the principal action mapped to the top-level control button;
an operating system embodied on the processing component that provides system metrics, wherein the system metrics are based on, in part, resolution of the GUI, and wherein the system metrics dictate the threshold distance upon actuation of the top-level control button; and
a presentation component to render a menu, mapped to the top-level control button, that represents the presentation action at the GUI.

16. The computer system of claim 15, further comprising an application component running on the operating system that is manipulated by the user-initiated input applied at the top-level control button.

17. A computerized method for accessing a menu associated with a top-level control button, the method comprising:
detecting a location of actuation of a user-initiated input at a touchscreen component, wherein the location of actuation indicates the top-level control button by occurring within a command region associated with the top-level control button;
accessing system metrics, wherein the system metrics are based on, in part, parameters of the touchscreen component;
constructing a first set of trigger boundaries and a second set of trigger boundaries derived from the system metrics; wherein deriving comprises:
(1) establishing the first set of trigger boundaries at a first threshold distance in at least one radial direction from the location of actuation; and
(2) establishing the second set of trigger boundaries at a second threshold distance in at least one radial direction from the location of actuation;
detecting a drag-operation within the user-initiated input, wherein the drag-operation comprises an uninterrupted drag-movement from the location of actuation at the touchscreen display to a location of release from the touchscreen display, wherein a distance and a radial direction of the drag-movement are determined as a function from the location of actuation;
if the distance and the radial direction of the drag-movement intersects one of the first set of trigger boundaries, invoking a presentation action mapped to the top-level control button;
if the distance and the radial direction of the drag-movement intersects one of the second set of trigger boundaries, invoking an alternate action, which is mapped to the top-level control button, that is unrelated to a principle action;
otherwise, invoking the principal action mapped to the top-level control button; and
rendering an indication of invoking at least one of the presentation action, the alternate action, or the principle action at a graphical user interface (GUI).

18. The computerized method of claim 17, wherein invoking the presentation action comprises revealing a list of selectable options, wherein invoking the principle action comprises initiating a first subroutine, and wherein invoking the alternate action comprises relocating the top-level control button on the GUI from a first position to a second position.

19. The computerized method of claim 18, further comprising:
receiving an indication of a selection of one of the list of selectable options; and
amending functionality of the principle action to invoke a second subroutine, associated with the selected one of the list of selectable options, upon detecting an appropriate user-initiated input at the top-level control button.

20. The computerized method of claim 17, further comprising:
modifying the top-level control button to visually indicate functionality for invoking the presentation action upon detecting the user-initiated input; and
hiding the visual indication upon cessation of the user-initiated input.

* * * * *